E. L. STEWART.
INCUBATOR THERMOSTATIC CONTROL.
APPLICATION FILED MAR. 7, 1917.
1,311,098.
Patented July 22, 1919.
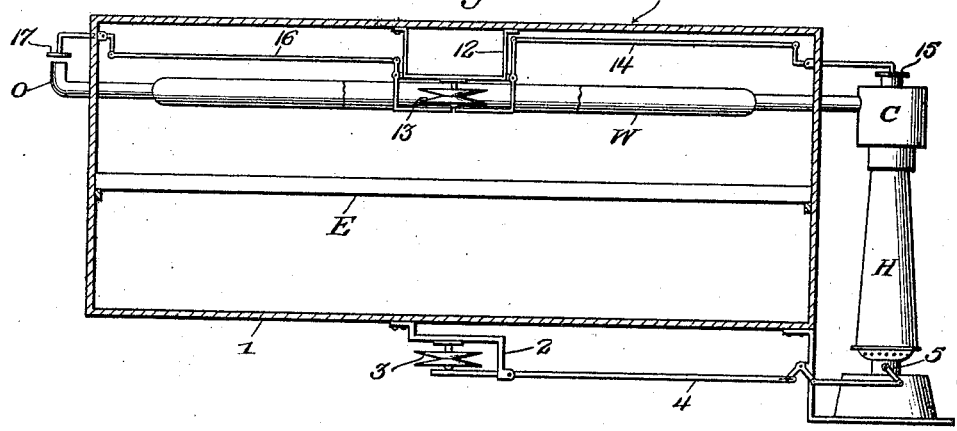
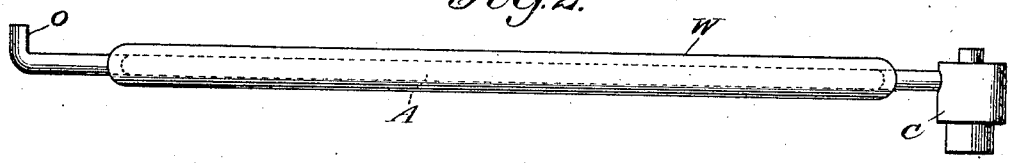
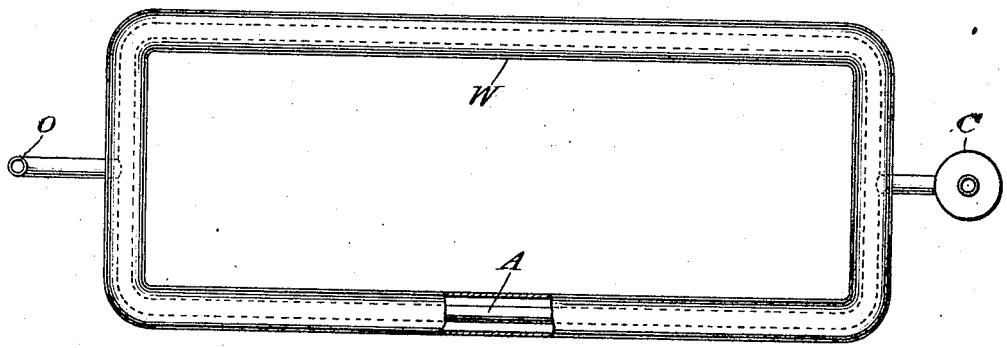
WITNESSES
INVENTOR
E. L. Stewart,
BY Victor J. Evans
ATTORNEY

UNITED STATES PATENT OFFICE.

ERNEST L. STEWART, OF LA VETA, COLORADO.

INCUBATOR THERMOSTATIC CONTROL.

1,311,098. Specification of Letters Patent. Patented July 22, 1919.

Application filed March 7, 1917. Serial No. 153,022.

*To all whom it may concern:*

Be it known that I, ERNEST L. STEWART, a citizen of the United States, residing at La Veta, in the county of Huerfano and State of Colorado, have invented new and useful Improvements in Incubator Thermostatic Controls, of which the following is a specification.

The invention relates to heating systems, and more especially to those adapted for brooders and incubators; and the broad object of the same is to regulate the temperature inside the apparatus by means of a thermostat or other controlling device located outside of the apparatus, whereby the temperature is controlled by the air in the apartment containing the apparatus, before said air gets into it. By faithful investigation I have found that, when sudden changes occur in the air in a room containing my incubator (as for instance when a door is opened and the room gets colder) the thermostat or other controlling device within the incubator does not act to control the heat until the cooler air gets into the casing of the apparatus itself. Therefore to an extent the temperature therein falls before regulation takes place to increase the heat and raise it again. I propose to avoid this contingency by locating the thermostat outside of the casing where it will be subjected to changes of temperature within the apartment containing the incubator or brooder or the like, and before the colder air for instance gets into the apparatus itself.

In an amplified construction as described below, I apply and employ another thermostat inside the casing of the apparatus, and connect it with the lamp or heat outlet, so as to safeguard the same against sudden changes of temperature in case the outside thermostat should not act or should not act thoroughly or quickly. I do not wish to be limited as to details of construction of the apparatus or the thermostat, and to an extent therefore the accompanying drawings are diagrammatic in nature. Referring to them by figure:—

Figure 1 is a vertical section through an incubator containing thermostats both outside and inside of its casing, that inside being connected with the heat outlet from the heater and the hot air outlet from the casing.

Fig. 2 is a side elevation, and

Fig. 3 a plan view of one form of a heating system which may well be applied in this connection.

In the illustration herewith I have shown my invention as applied to an incubator broadly designated by the letter I and whereof it is necessary to show only one egg tray E, and the heater H is shown as an ordinary oil lamp properly supported outside the incubator as usual. Proportions, materials, and details of parts are not necessary. In Fig. 2 the air pipe A leading from the lamp chimney C to the air outlet O is surrounded by a water jacket W in which the water takes up the heat of the air at its source and equalizes it throughout the length of the jacket, so that it is delivered to the interior of the casing at one temperature throughout. I merely suggest this, however, as one means of equalizing the heat but a heater which uses a lamp chimney C and an air outlet O is useful in my invention.

Coming now to the details of the present invention, the casing 1 of the incubator carries at some suitable point a bracket 2 which supports some appropriate form of thermostat 3 at any appropriate place, as beneath the casing as shown. If this thermostat be of the type illustrated in Fig. 1, which employs mercury, I propose to fill it so that it will have a working base of about 60° to 65° Fahrenheit. One end of the thermostat is connected up with the bracket supported thereby, and the other end is connected by link mechanism 4 with the wick control 5 of a trip burner in the heater H. Details are unessential, excepting that the entire thermostat must be outside the casing 1.

Located within said casing and preferably at a point near its top is another thermostat 13 mounted on a suitable support or bracket 12, and if this be of the mercury type I preferably fill it so that it will have a working base of about 112° Fahrenheit. One end of the thermostat is attached to the bracket 12, and the other end is connected by link mechanism 14 with the draft control of the heater, herein shown as a damper or cut-off 15 at the top of its chimney. I may also employ additional link mechanism 16 leading from the same thermostat 13 in the opposite direction to the draft control at the outlet end O of the air flue A, herein shown as a damper or cut-off 17 somewhat like that over the chimney at 15. However, when both these controls are connected with the thermostat 13, the connection must be such that as the air control 17 closes to shut off or retard the outlet of hot air, the lamp control 15 opens so as to permit the heat to pass out the chimney rather than through the incubator. The reverse action also takes place when the thermostat 13 acts oppositely. As above suggested, I do not wish to be limited to details but give these explanations by way of illustration only.

The primary idea of my invention is carried out by locating the thermostat 3 on the outside of the casing and connecting it with the heater H. This may be employed alone or with the other thermostat described. When the latter is used it is within the casing 1 of the incubator at some convenient point, and it is connected either with the heater or the air outlet, or possibly with both. If both thermostats are employed I preferably set them for action on a working base as suggested above. The result will be that, should the temperature within the room change suddenly, the outside thermostat feels it first and if it acts quickly and perfectly there is no change of the temperature on the inside of the casing. If the change is excessive or the action of the outside thermostat imperfect or tardy, then any change on the inside of the casing is felt by the more sensitive inside thermostat which therefore serves as a safeguard or as a secondary and supplemental heat-regulating device. The inside thermostat may control the source of heat or the outlet of heat or both as suggested.

What is claimed as new is:—

The combination with an incubator and a heater supplying heat thereto, and a thermostat within the incubator and responsive to the temperature therein for controlling the delivery of heat to the incubator, of a second thermostat responsive to the temperature of the air outside the incubator for controlling the generation of the heat, said thermostats acting independently of each other.

In testimony whereof I affix my signature.

ERNEST L. STEWART.

Copies of this patent may be obtained for five cents each, by addressing the "Commissioner of Patents, Washington, D. C."